2,936,279
APPARATUS FOR OZONIZING OXYGEN CONTAINING GASES UNDER PRESSURE

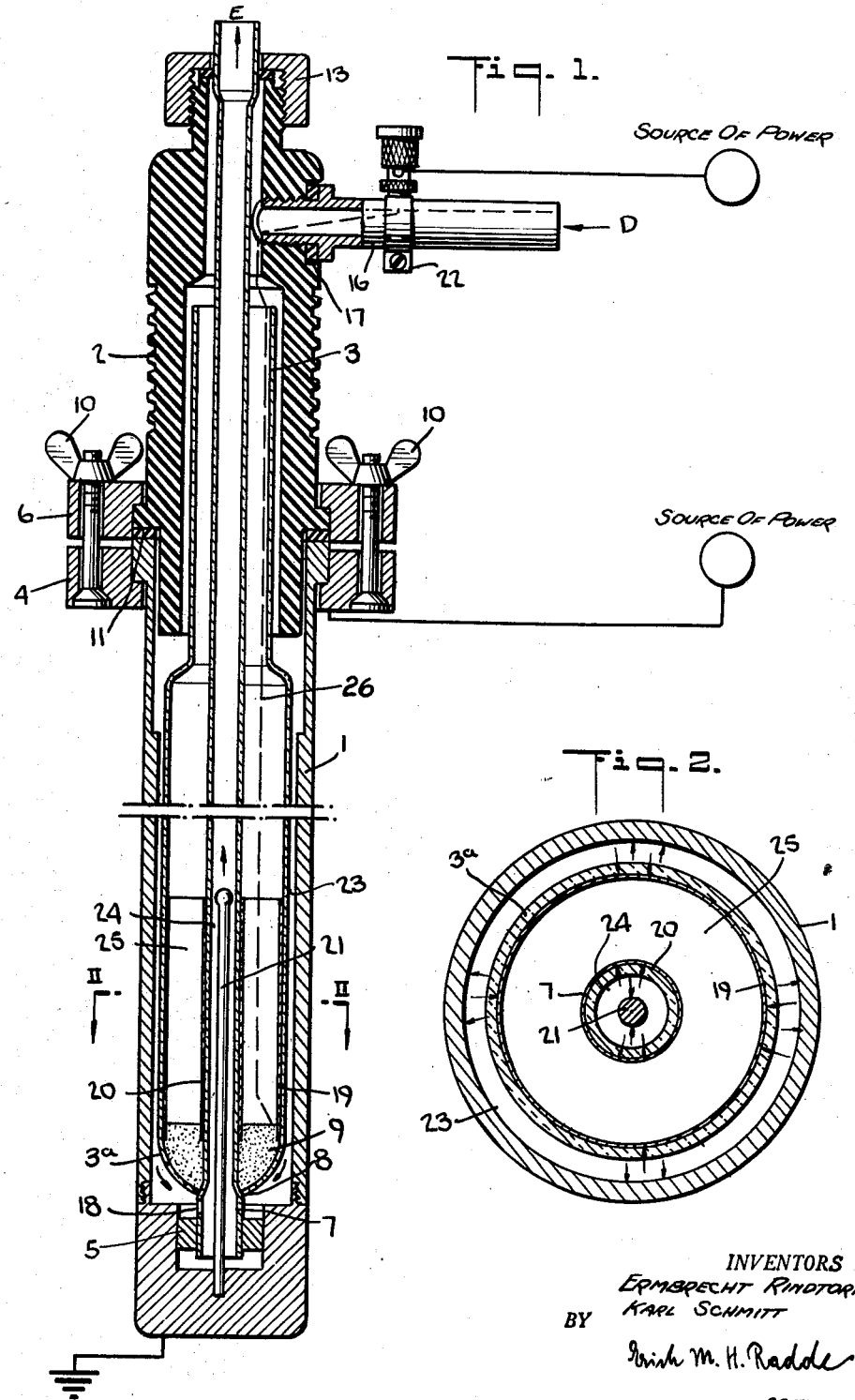

Ermbrecht Rindtorff, Recklinghausen, and Karl Schmitt, Herne, Germany, assignors to Bergwerksgesellschaft Hibernia Aktiengesellschaft, Stickstoffwerk Wanne-Eickel, Germany, a corporation of Germany Continuation of application Serial No. 347,332, April 7, 1953. This application December 10, 1956, Serial No. 627,294

Claims priority, application Germany April 8, 1952

8 Claims. (Cl. 204—316)

The present invention relates to improvements in the process of generating ozone from oxygen containing gases, and more particularly to a process of and apparatus for generating ozone under superatmospheric pressure.

This is a continuation of our application Serial No. 347,332, filed April 7, 1953, and entitled "Method of and Apparatus for Ozonizing Oxygen Containing Gases."

The present invention relates to that type of ozone generator in which an interrupted electric current of preferably high voltage and high frequency is caused to pass between electrodes and through interposed dielectrics so as to produce a silent electric discharge. Such ozone generators are operated on voltages ranging from 5,000 volts to 25,000 volts and on frequencies from 50 cycles to 5000 cycles. When an oxygen containing gas, such as air, is passed through the free space between such electrodes and is exposed to the silent electric discharge, oxygen is converted into ozone. All the known ozonizers, however, operate without pressure, i.e. at the most at atmospheric pressure.

It is a primary object of this invention to provide a process of and apparatus for generating ozone from oxygen or oxygen containing gases in a generator of the above type under superatmospheric pressure in high yields and to make it possible, if desired, to use ozonized gas directly for oxidation reactions which are carried out under pressure.

The above and other objects are accomplished in accordance with the invention by feeding an oxygen containing gas under superatmospheric pressure into a pressure-resistant ozonizing chamber in the presence of a silent electric discharge adapted to convert oxygen into ozone in the chamber and directing the gas under pressure into an additional pressure-resistant ozonizing chamber, a silent electric discharge therein converting further oxygen into ozone.

These and other features and advantages of the present invention will be described more fully in connection with the following detailed description of a preferred embodiment of an ozone generator useful in the practice of the invention. It is to be understood, however, that this invention is not limited to the apparatus disclosed by way of example. Rather, it will be obvious to the skilled in the art that the invention may be practiced with many changes and modifications without departing from the spirit and scope thereof, as defined in the appended claims.

The invention is illustrated in connection with a tubular apparatus in the accompanying drawing, wherein Fig. 1 is a longitudinal section of the ozone generator; and Fig. 2 is a section along line II—II of Fig. 1.

Referring to the drawing, the pressure ozone generator is shown to comprise an external, pressure-resistant cylindrical part composed of tubes 1 and 2. The two tubes are pressure-tightly connected by means of flange rings 4 and 6 joined by wing screws 10, gasket 11 being interposed to assure a pressure-tight connection. Tube 1, which is closed at the bottom, consists of a rigid, electrically conductive material capable of withstanding the operating pressure of the apparatus. Aluminum is preferred. An annular support member 5 is arranged in a recess in the bottom of tube 1 to hold glass tube 7 in concentric relationship with the tube. Concentrically arranged about tube 7 and sealed thereto at shoulder 8 is glass tube 3 having an enlarged bottom portion 3a.

Tube 2 is made of an electrically insulating material, a rigid, pressure-resistant plastic or porcelain being suitable for this purpose. Tube 2 is sealed on top by removably mounted screw cap 13, gasket 14 being provided to effect a pressure-tight connection. Glass tube 7 emerges from the pressure-tight tubing 1, 2 through central opening 15 in the screw cap 13, forming the ozone-containing gas output E of the apparatus. Lateral oxygen-containing gas input tube 16 is mounted in the side wall of tube 2, gasket 17 being provided to assure a pressure-tight connection. The gas enters tube 16 at D and leaves the apparatus at E in the direction of the arrows, the gas traveling downwardly to the bottom of the pressure-resistant tubing 1, 2 and rising upwardly in glass tube 7 through aperture 18 provided in tube 7 near the bottom thereof.

The inner wall of tube bottom portion 3a as well as the outer wall of the corresponding portion of tube 7 is provided with electrode layers 19, 20 of a solid conductive material. This material may be any thin powder layer or foil of a metal which does not readily oxidize and which may be applied to the glass walls so as to form a thin layer. An extremely thin homogeneous layer of colloidal graphite is preferred. Conductor material 9 is placed in the bottom of tube portion 3a to connect layers 19 and 20. Preferably, this conductor material is pulverulent graphite. Electrode rod 21 is axially fixed to the bottom of conductive tube 1 and extends into glass tube 7. The rod is rigidly supported by tube 1 and in conductive connection therewith. Conductor wire 26 (indicated in dotted lines) connects electrodes 19 and 20 with electrical connector 22 mounted on inlet tube 16. The electrical connector is connected to a source of electrical current, preferably of high voltage and high frequency. Metal tube 1 is connected to a similar source of power and is grounded as shown. Since tube 2 is made of insulating material, there is no possibility of a short circuit between the two sources of power supply. Also, the entire apparatus may be handled by gripping this non-conductive part.

When current is supplied to tube 1 and electrode rod 21, on the one hand, and to electrode layers 19, 20, on the other hand, tube 1 forms one pole of an electric field and layer 19 forms the other pole thereof, creating a silent electrical discharge therebetween in the annular chamber 23. Concurrently, rod 21 forms the other pole thereof, creating a second silent electrical discharge therebetween in annular chamber 24, the electrical discharge in the two annular chambers being indicated by the arrows in Fig. 2. The annular chamber 25 in bottom portion 3a of tube 3 is a dead space where no electrical discharge and, therefore, no ozonization and concomitant heat development takes place.

The ozone generator operates as follows:

Oxygen containing gas is fed into the apparatus at a pressure of 0–25 atmospheres, preferably about 3–5 atmospheres. Simultaneously, the power is turned on to create the silent electrical discharge in the above-described annular chambers. When the gas travels first downwardly through chamber 23 and then reverses its course, entering tube 7 and chamber 24 through aperture 18, the silent electrical discharge in said chambers will ozonize the gas and the ozone-enriched gas will leave the apparatus at E. Thus, the gas is exposed to the action of a silent electrical discharge in both directions of flow while remaining under pressure. No ozone will be generated in dead space 25 where no electrical discharge is produced. However, the same gas pressure will exist in chamber 25 as exists in annular chambers 23 and 24, thereby equalizing the pressure on both sides of glass tubes 3 and 7. This makes it possible to make the tubes of thin glass, which is very desirable for the dielectric elements, without incurring the danger of collapse under superatmospheric pressure. Since the external tubes 1 and 2 are also pressure-resistant, the ozone generator may operate faultlessly under superatmospheric pressure conditions.

With an apparatus of this type, best results are obtained with voltages ranging between about 10,000 and 14,000 volts and frequencies between 50 and 5000 cycles. Suitable changes in these values may be made under specific operating conditions, as will be obvious to the skilled in the art. The amount of oxygen containing gas supplied to the unit is also variable within wide limits. The yield of ozone depends upon the amount of gas passing through the apparatus and the oxygen content of such gas. The higher the speed of gas current or the greater the amount of oxygen passing through the generator, the lower will be the degree of ozonization of the gas. If desired, the gas may be fed at atmospheric pressure but superatmospheric pressures up to about 25 atmospheres are preferred.

While the preferred material for tube 1 and flange rings 4 and 6 is aluminum, other metals and alloys which are difficult to oxidize may be used, such as copper, brass and the like. The tube and the flange rings may be made of the same or different conductive materials.

Tube 2 may be made of any good insulating material which is resistant to oxygen. Porcelain is preferred but many plastics are equally suitable.

Since the oxygen containing gas is passed through the apparatus under pressure rapidly in countercurrent, being subjected to ozonization in both directions of flow, a high yield is obtained without the danger of decomposition of the ozone. This absence of decomposition has been experimentally established when oxygen containing gas at pressures as high as 25 atmospheres was fed into the ozone generator and 200 to 250 g. of ozone per kilowatt hour was produced with a current of about 10,000 to 14,000 volts and a frequency of up to 5,000 cycles.

With the pressure ozone generator of this invention, it is possible to carry out directly oxidative processes, for instance, in organic chemistry, under pressure with the ozonized gas delivered under preferably the same pressure from the generator. Since the ozonized gas is rapidly removed from the generator under the prevailing pressure, any developing reaction temperature will have no chance to decompose the ozone, assuring high yields. Preferably, the tubing 1, 2 is externally cooled simply by water, no complicated cooling means being required at the comparatively low temperatures developed in the rapid reaction in the generator.

A further advantage of the apparatus is its extreme simplicity of construction and the ease with which it may be dismantled and assembled again by simply removing or replacing a few bolts or screws.

We claim:

1. An ozone generator adapted to ozonize an oxygen containing gas under pressure, said generator comprising a pressure-resistant external tubing closed at one end, conduit means adjacent the other end for feeding the gas into said tubing under pressure, two concentrically arranged glass tubes mounted in the external tubing, an annular chamber being formed between the external tubing and the outer one of said glass tubes, said outer glass tube being open at its one end adjacent the gas inlet and being closed at its other end, the inner one of said glass tubes being open at both ends and communicating with the annular chamber adjacent the closed end of the external tubing and near one of its ends, its other end emerging from the other end of the external tubing and constituting a gas output, pressure-resistant sealing means mounted on the other end of the tubing, first solid electrode means consisting of two electrodes arranged about and separated by said annular chamber, second solid electrode means consisting of a central electrode mounted within and extending into the inner glass tube and an electrode arranged about said inner glass tube to form a second annular chamber therebetween, the two annular chambers being separated by an annular dead space free of any electric discharge, said first-mentioned annular chamber and said dead space being in communication at the open end of the outer glass tube to equalize the pressure in the dead space and in said annular chamber, two electric energy sources connected to said first and second electrode means to provide silent electric discharges in said annular chamber, and electrical insulation means arranged between the electrical energy sources to prevent short-circuiting.

2. The ozone generator of claim 1, wherein the outer concentric glass tube is sealed to the inner glass tube adjacent the one end of the inner glass tube, the annular dead space being formed between the two glass tubes.

3. The ozone generator of claim 1, wherein the external tubing comprises a portion adjacent its one end which consists of electrically conductive material, said conductive portion forming one electrode of said first electrode means and being connected to one of said electric energy sources, the central electrode being rigidly mounted on the closed end of said conductive portion, and a portion adjacent its other end consisting of electrically insulating material, said material forming said insulation means, and electrical conductor means mounted on the insulating tubing portion and connecting the other electric energy source to respective electrodes of the first and second electrode means.

4. An ozone generator adapted to ozonize an oxygen containing gas under pressure, comprising a pressure-resistant external tubing closed at one end, said tubing consisting of an electrically conductive portion adjacent and including the closed end and an electrically insulating portion connected thereto, means for pressure-tightly connecting the two tubing portions, conduit means mounted in the insulating tubing portion for feeding the gas into the tubing under pressure, two concentrically arranged glass tubes mounted in the tubing, the outer one of said glass tubes being open at its one end adjacent the gas inlet and being closed at its other end, the inner one of said glass tubes being open at both ends and emerging from the other end of the external tubing to form a gas output, pressure-resistant sealing means mounted on said other tubing end, the outer one of the glass tubes being sealed to the inner glass tube near the closed end of the external tubing, the conductive external tubing portion and the outer glass tube defining an annular chamber therebetween, a solid central electrode mounted on the conductive closed end of the external tubing and extending into the inner glass tube to define a second annular chamber between the inner glass tube and said central electrode, solid electrically conductive material arranged on the inner wall of the outer glass tube and the outer wall of the inner glass tube adjacent said annular chambers, said annular chambers being in communication with each other but separated by an annular dead space free of any electric discharge, said first-named annular chamber and said dead space being in communication to equalize the pressure in the dead space and in said annular chamber, and means for applying electrical energy comprising two electric energy sources connected, respectively, to said conductive material and to the conductive external tubing portion and the central electrode to produce a silent electric discharge in said annular chambers, the latter means being arranged on the insulating tubing portion to prevent short-circuiting.

5. The ozone generator of claim 4, wherein said outer glass tube has an enlarged portion near its sealed end and adjacent said annular chambers, said dead annular chamber being formed by said enlarged tube portion between the two annular chambers.

6. The ozone generator of claim 4, wherein the electrically conductive material arranged on the walls of the outer and inner glass tubes is colloidal graphite.

7. The ozone generator of claim 4, wherein the conductive external tubing portion is of aluminum.

8. The ozone generator of claim 4, wherein said means for applying electrical energy comprise two sources of high voltage, high frequency current.

References Cited in the file of this patent

UNITED STATES PATENTS

| | | |
|---|---|---|
| 942,046 | Ashley | Dec. 7, 1909 |
| 982,587 | Gerard | Jan. 24, 1911 |
| 1,130,827 | Knox | Mar. 9, 1915 |
| 1,358,443 | Held | Nov. 9, 1920 |
| 1,594,949 | Hartman | Aug. 3, 1926 |